United States Patent Office 3,538,575
Patented Nov. 10, 1970

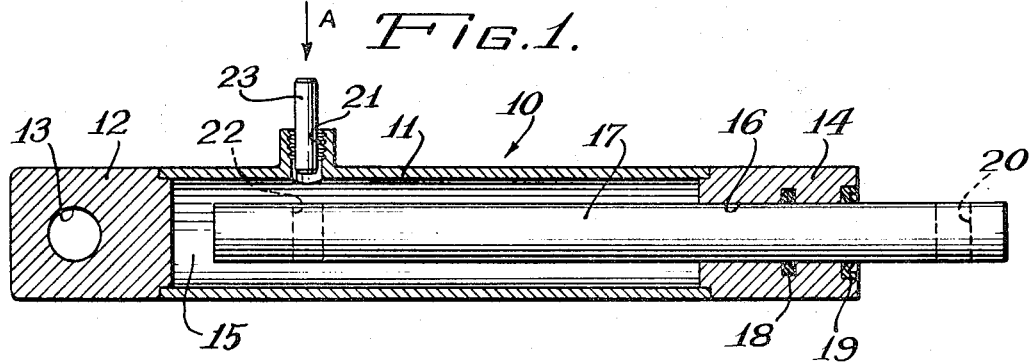
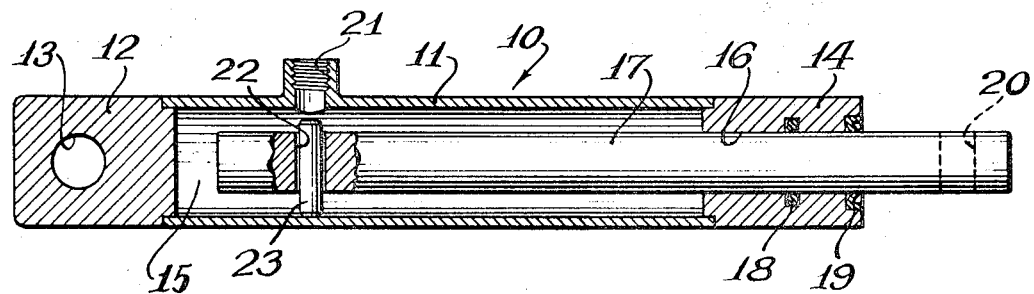
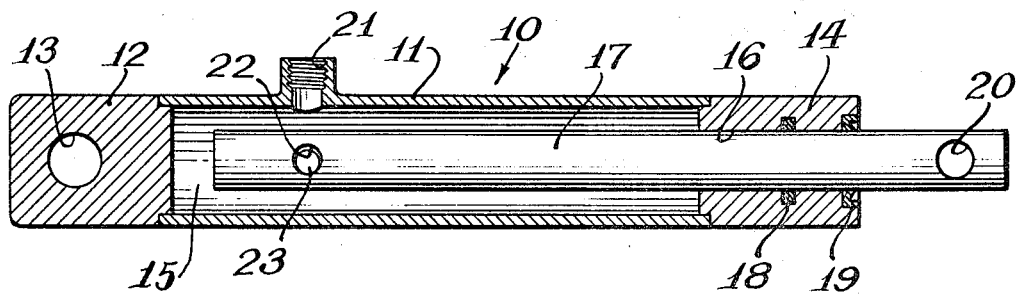

3,538,575
UNITARY CYLINDER WITH PISTON
RETAINING MEANS
Murray C. Roland, Hamilton, Ontario, Canada, assignor to International Harvester Company, Chicago, Ill., a corporation of Delaware
Continuation of application Ser. No. 644,263, June 7, 1967. This application Jan. 21, 1969, Ser. No. 796,289
Int. Cl. B23p 15/00
U.S. Cl. 29—156.4              2 Claims

ABSTRACT OF THE DISCLOSURE

A piston and cylinder assembly wherein the cylinder includes a closed end portion at one end and a piston-receiving bore at the other end. The cylinder includes a radially extending fluid inlet outlet port communicating with the interior of the cylinder. A piston is receivable through the bore and includes an opening extending transversely therethrough which is adapted to be aligned with the port. A pin is adapted to be inserted through the port into the opening in the piston and serves to limit the movement of the piston outwardly from within the cylinder to retain the piston within the cylinder during normal reciprocating movement thereof.

This application is a continuation of Ser. No. 644,263, filed June 7, 1967, now abandoned.

BACKGROUND OF THE INVENTION

The increasing use of unitary or integrally formed hydraulic cylinders has presented a problem relating to the means by which the piston is mounted in the cylinder and retained therein through normal operation. More specifically such cylinders are frequently cast in one piece or formed of welded construction such that the piston must be inserted into the completed cylinder through the bore which slidably and sealingly engages the piston in normal use. The specific problem in units of the above type relates to providing satisfactory means for retaining the piston in the cylinder by also permitting removal of the piston when desired.

Various methods have been proposed including the use of snap rings, threaded extensions and the like which must be introduced into the cylinder and coupled to the piston. In many of these systems the cylinder must be machined or cast into a particular configuration to accommodate the ingress and internal positioning of the retaining member for subsequent coupling to the piston within the cylinder. A specific example of a prior system involves drilling and threading an access opening into the cylinder for receiving the retaining members and also providing a threaded plug to close the opening after the piston is operatively installed. The cost of machining and fabricating the unit is accordingly increased. Other prior art arrangements require the introduction of a tool into a special tool-access opening in the cylinder to remove the retaining members from the piston to permit its withdrawal from the cylinder.

SUMMARY

With the foregoing in mind it is accordingly a primary object of the invention to provide a piston and cylinder assembly utilizing a unitary or integrally formed type of cylinder while providing a greatly simplified and effective means for retaining the piston within the cylinder for normal operation.

Another object is to provide a piston-cylinder assembly which permits the cylinder to be constructed without any special or extra features being required for accommodating the means for coupling and retaining the piston in the cylinder, to the end that the cost of design and manufacturing are reduced to a minimum heretofore unattainable.

Another object is to provide an assembly of the above type which enables the piston to be removed quickly and easily without requiring tools and special tool-access openings in the cylinder.

Briefly these and many other objects and advantages of the invention are attained by providing a piston and cylinder assembly including a unitary cylinder defining a cylindrical working chamber into which an axial bore communicates for slidably supporting a piston receivable in the chamber. The cylinder also includes a fluid inlet outlet port communicating radially into the chamber.

The piston of the assembly includes a transverse opening defined therethrough in a portion thereof received and reciprocable within the chamber during operation. The piston is movable with respect to the cylinder enabling the opening to be axially aligned with the fluid inlet outlet port.

The assembly includes means insertable through the fluid port into the opening in the piston for limiting movement of the piston outwardly from the chamber during operation of the assembly.

BRIEF DESCRIPTION OF THE DRAWINGS

FIG. 1 is a sectional view of the cylinder and piston assembly of the invention illustrating the orientation of the piston with respect to the fluid inlet outlet port of the cylinder enabling a retainer pin to be installed in the assembly;

FIG. 2 is a sectional view similar to FIG. 1 illustrating the pin received in the assembly; and FIG. 3 is a sectional view illustrating the invention in assembled relation.

DESCRIPTION OF THE PREFERRED EMBODIMENT

Referring first to FIG. 1 there is shown a cylinder indicated generally at 10 which includes a tubular portion 11 joined as by welding to an end closure member 12 having a coupling-receiving opening 13 defined transversely therethrough. An end portion 14 is joined as by welding to the opposite end of the tubular portion 11 such that the members 11, 12 and 14 provide a unitary cylinder defining a longitudinally cylindrical working chamber 15 therein.

The end portion 14 includes a central axially extending bore 16 communicating with the working chamber 15. The bore 16 is of a diameter less than the internal diameter of the working chamber 15 and is adapted to slidably and sealingly support a cylindrical piston 17 therein as shown. Appropriate sealing means such as an O-ring 18 and a lip seal 19 are mounted in the end portion 14 to sealingly engage the periphery of the piston 17. In accordance with common practice the portion of the piston 17 extending outwardly of the cylinder 10 includes an aperture 20 defined transversely therethrough for coupling the piston 17 to a member (not shown) to be actuated by the cylinder-piston assembly.

The cylinder 10 includes a fluid inlet-outlet port 21 communicating radially into the working chamber 15 for threadedly receiving a suitable fluid line (not shown) of a pressure system.

In accordance with a feature of the invention the portion of the piston 17 operatively disposed within the chamber 15 includes a longitudinally cylindrical opening 22 defined transversely and diametrically therethrough as shown. The piston 17 is movable with respect to the cylinder 10 such that the opening 22 may be axially aligned with the fluid port 21. A longitudinally cylindrical pin 23 is provided for insertion through the port 21 into the opening 22 as shown in FIG. 2. The pin 23 has a diameter slightly less than the diameter of the opening 22 so as to be freely slidable transversely of the piston within limits defined by the engagement of the pin 23 with the walls of the tubular portion 11. It has been found in practice that the frictional engagement of the pin 23 against the walls of the tubular portion 11 is negligible during reciprocation of the piston.

The pin 23 has a length less than the diameter of the chamber 15 but preferably greater than the total of the diameter of the piston and the radial distance from the piston to the chamber wall. Accordingly the ends of the pin 23 will protrude radially from the piston 17 at the opposite ends of the opening 22 regardless of the relative diameters of the piston and the working chamber. By this arrangement both ends of the pin are positioned to contact the end portion 14 to limit the outward stroke of the piston, without creating bending forces on the piston.

The opening 22 is preferably drilled through the piston 17 parallel to the aperture 20 for purposes to be described.

In the assembly of the cylinder-piston unit of the invention, the piston 17 is inserted through the bore 16 to extend into the working chamber 15 of the cylinder 10. Since the opening 22 and aperture 20 are parallel, the piston may be quickly and easily positioned to align the opening 22 with the port 21 by visual reference to the alignment or position of the aperture 20 with respect to the port 21. When the opening 22 is aligned with the port 21 the pin 23 is simply dropped into the port 21 in the direction of arrow A and assumes the position shown in FIG. 2. The piston 17 is then rotated about its longitudinal axis to position the pin 23 out of alignment with the port 21 as shown in FIG. 3. Visual reference to the position or orientation of the aperture 20 with respect to the inlet port 21 provides an external indication of the position or orientation of the pin 23 within the cylinder 10.

It will be apparent that the pin 23 may be quickly and easily withdrawn from the piston and cylinder assembly, permitting the piston to be withdrawn from the bore 16, by again aligning the opening 22 with the port 21. The entire assembly may then be disposed to permit the pin 23 to fall out by gravity, or a magnet may be inserted into the port 21 for removing the pin.

The above described invention results in a simple, effective, and low cost assembly eliminating many features previously thought to be necessary to obtain the stated objectives.

What is claimed is:

1. A method of assembly of a unitary closed end cylinder, a piston, and a retaining pin, wherein the cylinder includes a working chamber of a given diameter and an end portion opposite said closed end through which an axial bore is defined of a diameter less than said given diameter and communicating with the chamber, said cylinder including a fluid inlet-outlet port communicating transversely into said chamber, said piston including a transverse opening defined therethrough, and said pin having a length less than said given diameter, comprising the steps of:
    inserting the piston into said chamber through said axial bore until said opening is coaxially aligned with said port;
    inserting the pin through said port into said opening until the pin is completely received in said chamber; and,
    rotating the piston about its longitudinal axis relative to the cylinder until the pin is out of coaxial alignment with said port, whereby said pin will engage said end portion for limiting movement of said piston outwardly from said chamber through said bore.

2. A method of assembly of a unitary cylinder, a piston, and a retaining pin, wherein the cylinder includes a working chamber of a given diameter defined by a closed end and an opposite end portion through which an axial bore is defined of a diameter less than said given diameter and communicating with the chamber, said cylinder including a fluid inlet-outlet port communicating transversely into said chamber, said piston having first and second transverse openings defined therethrough in parallel relation proximate to opposite ends respectively of the piston, and said pin having a length less than said given diameter, comprising the steps of:
    inserting said piston into said chamber through said bore until said first transverse opening is disposed in a transverse plane through said cylinder passing through the axis of said port with said second transverse opening being outside the cylinder;
    rotating said piston about its longitudinal axis relative to said cylinder until said second transverse opening is in parallel relation with said port to thereby coaxially align said first transverse opening with said port;
    inserting said pin through said port into said first transverse opening until the pin is completely received in said chamber; and
    rotating said piston about its longitudinal axis relative to the cylinder until the pin is misaligned with said port, whereby said pin will engage said end portion for limiting movement of said piston outwardly from said chamber through said bore.

References Cited

UNITED STATES PATENTS

| | | | |
|---|---|---|---|
| 2,372,694 | 4/1945 | Tabb | 29—156.4 X |
| 2,915,046 | 12/1959 | Larsen et al. | |
| 2,997,026 | 8/1961 | Zimmerer | 92—255 X |
| 3,065,734 | 11/1962 | Molzahn | 92—255 X |
| 3,391,612 | 7/1968 | Sneen | 92—128 |

JOHN E. CAMPBELL, Primary Examiner

V. A. O. PALMA, Assistant Examiner

U.S. Cl. X.R.

29—434; 92—128, 255